June 21, 1932.  K. K. WRIGHT  1,863,781
HEATER
Filed June 10, 1931   2 Sheets-Sheet 1
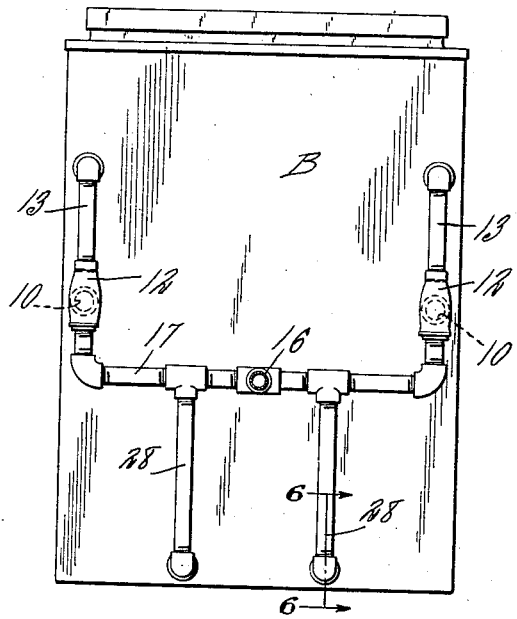
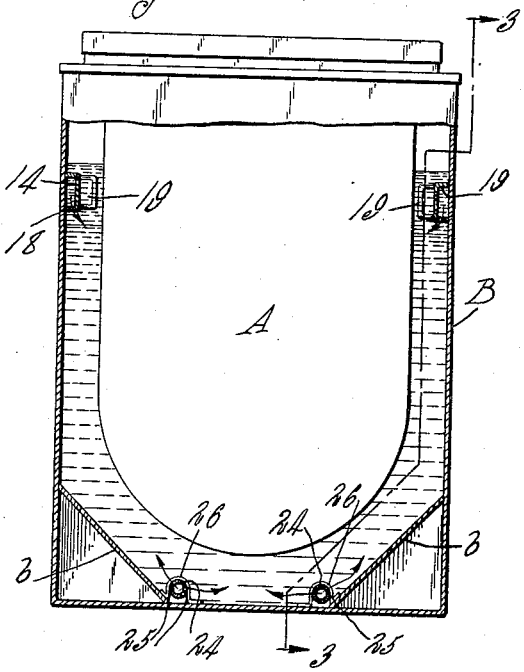
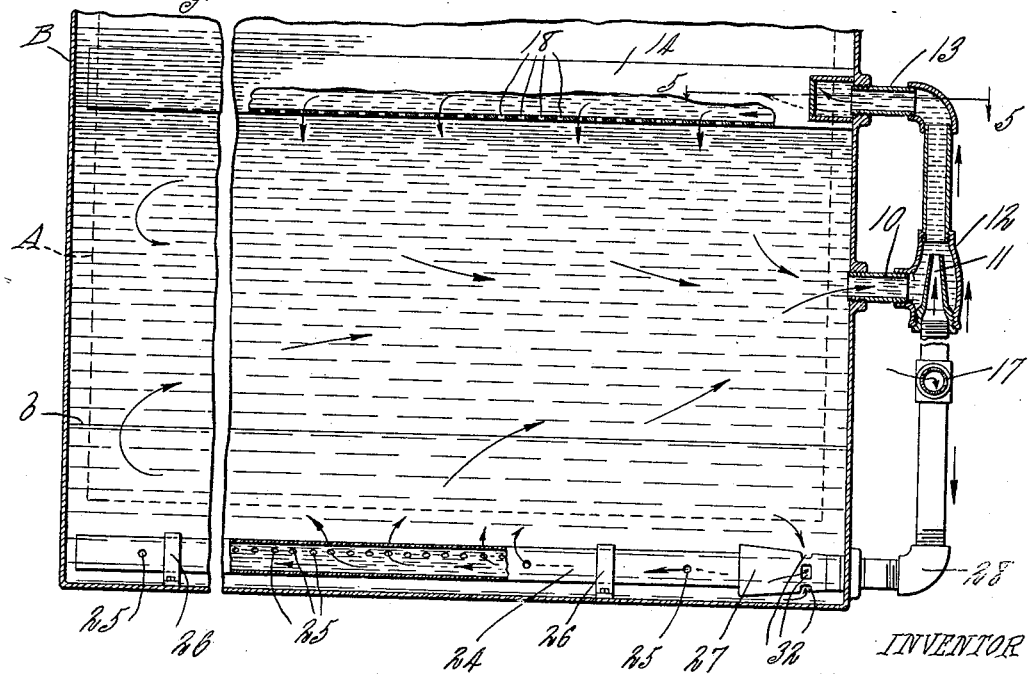
INVENTOR
Kirk K. Wright
by Parker & Brochnow
ATTORNEYS June 21, 1932.  K. K. WRIGHT  1,863,781
HEATER
Filed June 10, 1931  2 Sheets-Sheet 2
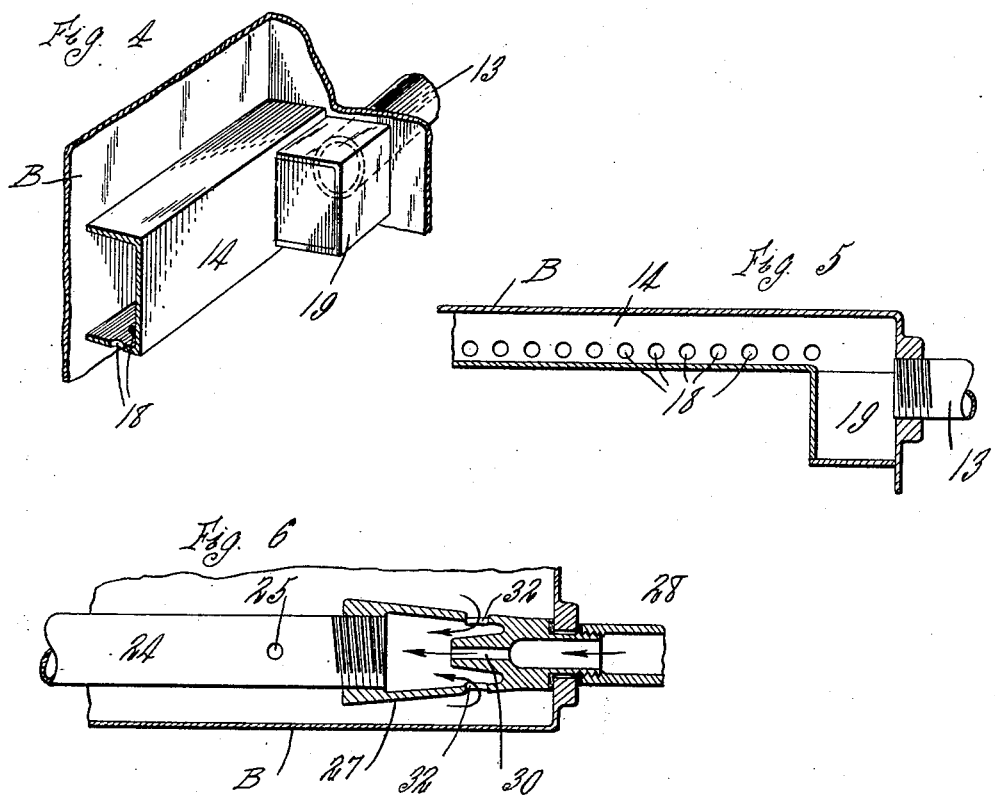
INVENTOR
Kirk K. Wright
by Parker & Brocknow
ATTORNEYS Patented June 21, 1932

1,863,781

UNITED STATES PATENT OFFICE

KIRK K. WRIGHT, OF KENMORE, NEW YORK, ASSIGNOR TO R. G. WRIGHT & COMPANY, OF BUFFALO, NEW YORK

HEATER

Application filed June 10, 1931. Serial No. 543,338.

This invention relates to heaters of the kind in which a fluid is used for heating a liquid in a container to the desired temperature, and more particularly to the heating and circulating of the heating fluid.

In the pasteurizing of liquids, such as milk, it is very necessary that no portions of the liquid be heated above a certain maximum temperature which is but slightly above the pasteurizing temperature. Under these circumstances, in order to have a pasteurizing apparatus operate efficiently and quickly in elevating the temperature of the liquid to be pasteurized, it is desirable to have all portions of the pasteurizing fluid as near to the maximum temperature as is possible. While this invention is illustrated in the accompanying drawings as applied to a pasteurizer, it will be understood that the invention is applicable to other types of heaters and is not restricted to pasteurizers.

The objects of this invention are to provide in a heater of this kind, heating and circulating means which operate to maintain the heating fluid at approximately the maximum temperature in all portions of the space in which the heating fluid is contained; also to provide a heater with a circulating system of this kind in which a heated fluid is introduced into the body of heating fluid at the upper and lower portions thereof; also to provide a heater with a circulating system in which heating fluid is withdrawn from the heater at a portion intermediate the upper and lower parts thereof; also to provide a heater in which a portion of the heating fluid is removed from the heater tank for applying heat thereto and another portion of the fluid is heated within the tank; also to improve the construction of circulating and heating means in other respects hereinafter specified.

In the accompanying drawings:

Fig. 1 is an end elevation of a heater or pasteurizer having applied thereto fluid heating and circulating means embodying this invention;

Fig. 2 is a transverse sectional elevation thereof;

Fig. 3 is a longitudinal sectional elevation thereof, approximately on line 3—3, Fig. 2, indicating in broken lines the location of the vat or container for the material to be heated;

Fig. 4 is a perspective view of a portion of a heater tank showing means for introducing heating fluid into the same;

Fig. 5 is a fragmentary sectional plan view thereof, on line 5—5, Fig. 3;

Fig. 6 is a fragmentary sectional elevation thereof, on line 6—6, Fig. 1.

A represents a container for the liquid to be heated or pasteurized, which container may be of any suitable shape or form, that shown in the accompanying drawings being in the form of a vat, into which a quantity of material or liquid to be heated or pasteurized is introduced and in which the liquid remains until completion of the heating or pasteurization. B represents the tank into which the vat or container A extends, the tank being sufficiently larger than the vat A to leave a space around the vat in which the heating fluid may be circulated to impart its heat to the liquid to be heated through the walls of the container A. The tank B may also be of any suitable or desired shape, that shown having inclined walls or partitions b near the lower portion thereof which restrict the amount of heating fluid in the tank.

In accordance with my improved fluid heating and circulating system, I provide means for supplying heated fluid to both the upper and lower portions of the tank and withdrawing fluid from the intermediate portion of the tank. Since the heating fluid in the two opposite side portions of the tank is separated by the vat A, I preferably provide heating and circulating means for each side of the tank. In the particular construction shown in the accompanying drawings, I withdraw fluid from the tank through pipes or ducts 10 and impart heat to the same by adding heated fluid through jets 11 within housings 12, connecting with the pipes 10. The resulting mixture of heated fluid and the fluid withdrawn from the tank B is conducted through pipes or passages 13 to distributing ducts 14 at the upper portions of the tank, one of these ducts being provided at each side of the tank. When water is being used as the heating fluid, steam may be passed through the nozzle 11, thus producing a flow of water through the housing 12 by means of the usual injector principle. In the construction shown, additional heating fluid, such as steam, may be conducted to the heater through a pipe 16 from any suitable source of supply and this pipe is connected with two branch pipes 17 extending toward opposite sides of the tank and terminating in the injector nozzles 11 in the housings 12. Any other way of conducting heating fluid to the injector nozzles may, of course, be employed, if desired.

The distributing duct 14 may also be of any suitable or desired construction. I have found, however, that very good results can be obtained by making this distributing duct in the form of a channel, which may be formed of sheet metal, and having the free edges of its legs welded or otherwise secured to the inner surface of the walls of the tank B. The channel or duct has apertures or discharge openings 18 through which the heated fluid may be discharged into the space between the vat A and tank B, and these holes or openings are preferably drilled or punched in the channels 14 in such a direction as to cause jets of fluid to be discharged through the apertures in a direction toward the vat wall, so that the incoming heated fluid will brush against the vat walls to produce a scrubbing effect which improves the transmission of heat from the fluid to the vat. One end of each of the distributor ducts 14 may communicate with the pipe 13 through the medium of a header or chamber 19 from which the heated fluid passes to the distributing duct 14, see particularly Figs. 4 and 5. The other end of each duct is preferably open or spaced slightly from the end wall of the tank, so that any fluid not discharged through the apertures 18, will be discharged from the end of the duct and will be deflected laterally by the end wall of the tank, to cause this fluid to circulate in the space between the adjacent ends of the tank and vat. The channel shaped distributor ducts also serve the purpose of reinforcing the portions of the tank walls adjacent thereto.

The portion of the heating and distributing system thus far described takes care of supplying heating fluid to the upper portions of the tank at opposite sides thereof and for withdrawing the somewhat cooler fluid from the intermediate portions of the sides of the tank. By means of the injector action, a rapid flow of fluid is induced through the housing 12 and pipes and ducts connected therewith, so that a thorough mixing of fluid in the tank with the incoming hotter fluid results.

The heating fluid in the lower part of the tank is preferably heated and circulated by means independent of the circulating system for the upper parts of the tank, and in the construction shown for this purpose, fluid heaters are arranged within the tank near the bottom thereof. These heaters may be of any suitable or desired kind, each of those shown being in the form of a mixing device or housing 27, which is shown more in detail in Fig. 6, and which receives additional heating fluid, such, for example, as steam, from pipes or ducts 28 connecting with the pipes 17 and extending into the lower portions of the tank. Each heater includes a discharge nozzle 30 communicating with the pipe 28 for discharging heated fluid toward the inlet end of a distributing pipe 24. The mixing device or housing 27 has apertures 32 through which fluid from the lower portion of the tank may enter, this flow of fluid being induced by an ejector action of the nozzle 30. In case where water is used as a heating liquid, steam may be passed through the nozzle 30, thus effecting a heating of the water and inducing a rapid flow of the water through the heater.

In order to effect a uniform distribution of the heated fluid to all parts of the tank, each heater is arranged to discharge the heated fluid to one end of a distributor pipe or duct 24, arranged at or near the bottom of the tank. This pipe has discharge apertures 25 arranged to effect the desired distribution of heated fluid to different parts of the tank. The other end of the distributor pipe preferably terminates at a slight distance from the adjacent end wall of the tank to cause fluid discharged from this end to be deflected into the space between the end walls of the tank and vat, as described in connection with the distributor duct 14. These ducts 24 may be suitably secured to the tank in any desired manner, for example, by means of straps 26 or the like.

The apertures 25 are arranged mainly to direct streams of heated fluid upwardly along the walls of the vat or container A. Consequently, any heating fluid which has become cooled, and consequently settles toward the bottom of the tank will be drawn into the apertures 32 of either of the heaters or mixing device 27 and will be reheated and directed into contact with the container A for the liquid to be heated. Some of this liquid, on contacting with the walls of the vat A, will become cooled and will then be drawn into the discharge pipes 10 and may be recirculated by means of the injector or heater 12.

The advantages of the circulating system described are that substantially all parts of the heating fluid in the tank B will be maintained in active circulation so that only very slight differences in temperature will exist in different portions of the tank. Consequently, heat will be conducted to a substantially similar extent through all portions of the vat or container A to the liquid to be heated. This increases the efficiency of the heater by reducing the length of time required to heat the liquid in the container A to the desired temperature, without exposing any portions of this liquid to temperatures greater than those to which this liquid can be subjected without effecting changes in the liquid. The construction described results also in a circulation of liquid lengthwise of the tank, since all of the injector nozzles draw liquid from one end of the tank and discharge the heated liquid toward the other end of the tank. By arranging the injector 12 outside of the tank and near the level of the pipe 10, the circulation of fluid through the distributor duct 14 is assured, even if the level of fluid in the tank should drop below that of the duct 14, but a heating device similar to the device 27 may be employed within the tank and connected with the duct 14, if desired.

The inlet openings 32 of the heater 27 are positioned near the space between the two adjacent end walls of the tank and vat, so that liquid from this space will be drawn downwardly into these inlets, thus providing for circulation of pasteurizing fluid in this space.

I claim as my invention:

1. A fluid heating and circulating system for heaters, including a container for the liquid to be heated and a tank into which said container extends and which forms with said container a space for the circulation of heating fluid, means for heating the fluid at the upper and lower portions of said space, and for withdrawing fluid from a portion of said space and for introducing the same into another portion of said space to provide for circulation of fluid in said space.

2. A fluid heating and circulating system for heaters, including a container for the liquid to be heated and a tank into which said container extends and which forms with said container a space for the circulation of a heating fluid, and means for introducing heated fluid at the upper and lower portions of said space and for withdrawing fluid from an intermediate portion of said space.

3. A fluid heating and circulating system for heaters, including a container for the liquid to be heated and a tank into which said container extends and which forms with said container a space for the circulation of a heating fluid, said space being maintained substantially filled with heating fluid, means for withdrawing fluid from a portion of said space and introducing the same into the upper portion of said space, and for heating the fluid withdrawn from said space before the same is returned to the upper portion of said tank.

4. A heater, including a tank for the heating fluid, a container for the liquid to be heated extending into said tank, a combined fluid circulating and heating system including means for withdrawing fluid from a portion of said tank below the upper portion thereof, and for supplying heated fluid to the upper and lower portions of said tank.

5. A heater, including a tank for the heating fluid, a container for the material to be heated extending into said tank, a combined fluid circulating and heating system including means for withdrawing fluid from a portion of said tank below the water level therein and returning the same to the upper portion of said tank, for heating said fluid during the circulation thereof, and for injecting heated fluid into the lower portion of said tank to induce a flow of fluid in said lower portion.

6. A heater, including a tank for water and a container for the material to be heated extending into said tank, and steam injector nozzles arranged to supply heat to the water in said tank and to discharge the heated fluid into the upper and lower portions of said tank.

7. A heater, including a tank for water and a container for the material to be heated extending into said tank, steam injector nozzles arranged to supply heat to the water in said tank and to discharge the heated fluid into the upper and lower portions of said tank, through distributing ducts extending lengthwise of said tank in the upper and lower portions thereof and provided with means for distributing the heated water to different portions of the tank lengthwise thereof.

8. A heater, including a tank for heating fluid, a vat for the material to be heated extending into said tank and forming with said tank a space for the circulation of heating fluid, distributor ducts arranged at opposite sides of said tank and in the upper and lower portions thereof and provided with apertures for discharging heated fluid at intervals into said space, and means for withdrawing fluid from a portion of said tank between the upper and lower portions thereof and for heating said fluid and discharging the same into a distributor duct.

9. A pasteurizer, including a tank for pasteurizing fluid, a vat for the liquid to be pasteurized extending into said tank and forming with said tank a space for the circulation of pasteurizing fluid, distributor ducts arranged at opposite sides of said tank and in the upper and lower portions thereof and provided with apertures for discharging heated fluid at intervals into said space, and means for admitting heated fluid into one end of each of said ducts, the other ends of said ducts terminating at a short distance from an end wall of said tank, to cause said end wall to deflect fluid discharged from the ends of said ducts into a transverse space between the end walls of said vat and tank.

10. A pasteurizer, including a tank for pasteurizing fluid, a vat for the liquid to be pasteurized extending into said tank and forming with said tank a space for the circulation of pasteurizing fluid, distributor ducts arranged at opposite sides of said tank and in the upper and lower portions thereof and provided with apertures for discharging heated fluid at intervals into said space, and an injector nozzle discharging heated fluid into fluid from said tank and discharging the mixed fluids into said distributor ducts to introduce the same into said tank and to produce circulation in said space.

11. A heater, including a tank for heating fluid and a container for material to be heated extending into said tank, means for adding heat to the heating fluid and circulating the same in said tank, including a distributor duct in said tank which is of channel shape, and which has discharge orifices at intervals lengthwise thereof, and which has the free edges of the flanges thereof secured to a tank wall for reinforcing said tank wall and for distributing heated fluid.

12. A heater, including a tank for heating fluid, a vat for the material to be heated extending into said tank and forming with said tank a space for the circulation of heating fluid, distributor ducts arranged at opposite sides of said tank and in the upper and lower portions thereof and provided with apertures for discharging heated fluid at intervals into said space, and means for withdrawing fluid from one end of said tank at a portion thereof below the water level in the tank, and for heating the fluid thus withdrawn and discharging the same into said distributor ducts.

13. A heater including a tank, a vat for the material to be heated extending into said tank for forming with said tank a space for the circulation of water, distributor ducts arranged at opposite sides of the tank in the lower portions thereof and provided with apertures for discharging water at intervals into said space, means for admitting steam into said distributor ducts to heat water in said ducts and produce circulation of water in said space, distributor ducts at opposite sides of said tank in the upper portions thereof, and means for withdrawing water from said tank, heating said water and discharging the same into said distributor ducts.

14. A heater including a tank, a vat for the material to be heated extending into said tank for forming with said tank a space for the circulation of water, means for admitting steam directly into the lower portion of said tank to heat the water and produce circulation thereof, and means for withdrawing water from said tank, heating the same and discharging the heated water into the upper portions of said tank.

15. A heater including a tank, a vat for the material to be heated extending into said tank for forming with said tank a space for containing a quantity of water, distributor ducts in the upper portion of said tank below the water level therein and adapted to discharge hot water into the body of water in said portion, and means for withdrawing water from said tank below the upper portion thereof, heating the water and discharging the same into said distributor ducts.

KIRK K. WRIGHT.